United States Patent
Tomomatsu et al.

(10) Patent No.: US 8,339,687 B2
(45) Date of Patent: Dec. 25, 2012

(54) RECORDING DEVICE, AND SUPPORT MECHANISM FOR SIDE GUIDE MEMBERS IN A RECORDING DEVICE

(75) Inventors: Shinsuke Tomomatsu, Matsumoto (JP); Kenichi Hirabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 456 days.

(21) Appl. No.: 12/696,864

(22) Filed: Jan. 29, 2010

(65) Prior Publication Data

US 2010/0195170 A1 Aug. 5, 2010

(30) Foreign Application Priority Data

Jan. 30, 2009 (JP) ................................. 2009-019198

(51) Int. Cl.
*H04N 1/04* (2006.01)
*H04N 1/21* (2006.01)

(52) U.S. Cl. ....................................... 358/498; 358/296

(58) Field of Classification Search ........................ None
See application file for complete search history.

(56) References Cited

U.S. PATENT DOCUMENTS

| | | | |
|---|---|---|---|
| 5,611,528 A | 3/1997 | Nakamura et al. | |
| 2007/0165089 A1 * | 7/2007 | Kozaki et al. | 347/101 |
| 2008/0150217 A1 * | 6/2008 | Koga et al. | 271/9.01 |

FOREIGN PATENT DOCUMENTS

| | | |
|---|---|---|
| JP | 59-177231 A | 10/1984 |
| JP | 04-350024 A | 12/1992 |
| JP | 07-206171 A | 8/1995 |
| JP | 2004-161443 A | 6/2004 |

* cited by examiner

*Primary Examiner* — Douglas Tran
(74) *Attorney, Agent, or Firm* — Kilpatrick Townsend & Stockton LLP (57) ABSTRACT

Recording devices with adjustable and lockable recording medium width guides, and support mechanisms for adjustable and lockable recording medium width guides are disclosed. A recording device includes a pair of recording medium width guides that control the widthwise position of a recording medium upon discharge from the recording device. A support mechanism supports the width guides and can lock the position of the width guides. The support mechanism includes a pair of sliding members individually coupled with one of the width guides, and a pressure member that clamps the sliding members together at a position where the sliding members overlap. The pressure member is configurable to clamp the sliding members together, and to unclamp the sliding members.

19 Claims, 10 Drawing Sheets

RECORDING DEVICE, AND SUPPORT MECHANISM FOR SIDE GUIDE MEMBERS IN A RECORDING DEVICE

CROSS-REFERENCES TO RELATED APPLICATIONS

Priority is claimed under 35 U.S.C. §119 to Japanese Application No. 2009-019198, filed on Jan. 30, 2009 which is hereby incorporated by reference in its entirety.

BACKGROUND

1. Technical Field

The present invention relates to a recording device that records images on a recording medium, and to a support mechanism for side guide members in the recording device.

2. Related Art

Recording devices for recording images on a recording medium according to the related art typically have guides that guide the recording medium as it is conveyed. Recording devices in which the guides are movable and can be adjusted to the width of the recording medium are also known from the literature. See, for example, Japanese Unexamined Patent Appl. Pub. JP-A-2004-161443.

The recording device taught in JP-A-2004-161443 can convey the recording medium in a stable, consistent manner by using guides adjusted (by moving the guides) to the size of the recording medium. If, however, the guides can be moved too easily, they may cease to function properly as guides and may actually interfere with the transportation of the recording media. Accidental movement of the guides may be particularly problematic. Such accidental movement may result from contact with some object or from the user's hand bumping the guides when the guides are exposed outside the recording device. Accordingly, a configuration that can positively lock the position of the guides is desirable, especially where the guides can be easily locked.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Recording devices having adjustable and lockable side guide members to guide a recording medium, and a support mechanism for adjustable and lockable side guide members in a recording device are provided. The side guide members are supported by a mechanism that enables easy adjustment of the side guide members to the size of the recording medium, as well as easy locking of the side guide members in the adjusted position.

Thus, in first aspect, a recording device is provided that records on a recording medium and discharges the recording medium from a discharge exit in a discharge direction. The recording device includes a guide member having a guide surface that supports the recording medium after discharge from the discharge exit, a pair of side guide members that restrict a position of the recording medium relative to the guide surface traverse to the discharge direction, and a support mechanism that supports the pair of side guide members relative to the guide surface. The support mechanism is operable to position the side guide members traverse to the discharge direction and lock the pair of side guide members in a desired position. The support mechanism includes a pair of overlapping sliding members and a pressure member. Each of the sliding members is coupled with one of the side guide members and configured to move relative to the guide surface traverse to the discharge direction. The pressure member is configurable to clamp the sliding members together at a position where the pair of sliding members overlap to lock the side guide members in position. And the pressure member is configurable to unclamp the sliding members by displacing an operating part of the pressure member. In many embodiments, the guide member includes a recess, and the operating part of the pressure member is disposed in the recess when the guide member are locked in position.

In many embodiments, the above-described recording device provides significant functionality. For example, the guides can be adjusted and then locked in a specific position. And the side guide members can be released from being locked by operating a pressure member that is exposed from a recessed part of the guide surface. Because the position of the pair of side guide members that control the position of the width of the recording medium can thus be locked with a simple operation, and can be unlocked and moved as needed, the side guide members can be easily adjusted to the width of the recording medium used. In addition, because pressure is applied to the overlapping sliding members so that they cannot slide, the side guide members can be positively locked with high precision and with no chatter.

In many embodiments, each of the sliding members includes a panel part extending traverse to the discharge direction. And the panel parts can overlap side by side. And one of the panel parts can include a protrusion facing the panel part of the other sliding member.

When pressure is applied to the sliding members at a position where the pair of sliding members overlap, the sliding members are held firmly by the pressure transferred through the protrusion. As a result, the side guide members can be locked positively by the simple operation of moving the pressure member.

In many embodiments, the recording device includes a spring member coupled with the pressure member to generate pressure pushing the panel parts of the mutually overlapping sliding members in contact with each other to clamp the sliding members together.

Because the sliding members are clamped together using the elasticity of a flat spring, the side guide members can be reliably locked, the pressure applied to the sliding members can be controlled within a suitable range so that the load on the sliding members can be controlled. As a result, a longer service life for the sliding members may be achieved, and the strength required in the sliding members may be reduced, thereby reducing size and cost.

In many embodiments, the pair of sliding members slide symmetrically relative to a centerline of the guide surface. In many embodiments, the support mechanism includes a gear mounted to rotate about an axis traverse to the discharge direction, and each of the sliding members includes gear teeth engaged with the gear. Such symmetrical movement serves to limit the position of the recording medium traverse to the discharge direction.

In many embodiments, the recording device includes a pair of internal side guide members that restrict a position of the recording medium inside a case of the recording device traverse to the discharge direction. And both the internal side guide members and the side guide members constrain side edges of the recording medium so that the recording medium is centered in a transportation path for the recording medium. The addition of the internal side guide members may serve to convey the recording medium smoothly because the widthwise position of the recording medium is aligned with the center of the transportation path inside the recording device and on the guide surface at the discharge exit.

In another aspect, a mechanism is provided for supporting a pair of recording medium side guide members in a recording device that records on a recording medium and discharges the recording medium from a discharge exit in a discharge direction. The support mechanism includes a pair of overlapping sliding members and a pressure member. Each sliding member is coupled with one of the side guide members and coupled with the recording device to move traverse to the discharge direction. The pressure member is operable to clamp the sliding members together at a position where the pair of sliding members overlap to lock the side guide members in position, and to unclamp the sliding members by displacing an operating part of the pressure member. The support mechanism is operable to position the side guide members traverse to the discharge direction and lock the pair of side guide members in a desired position. In many embodiments, the operating part of the pressure member is disposed in a recess of the printer when the side guide members are locked in position.

The support mechanism can have one, more, or all of the above described features, functions, and/or advantages of the above-described recording device. Because the disclosed recording devices and support mechanisms enable the positions of side guide members that control the position of a recording medium discharged from the discharge exit to be locked with a simple operation, and to be unlocked and moved as needed, the side guide members can be easily adjusted to the width of the recording medium used.

Other objects and attainments together with a fuller understanding of the invention will become apparent and appreciated by referring to the following description and claims taken in conjunction with the accompanying drawings.

DETAILED DESCRIPTION

In the following description, various embodiments of the present invention will be described. For purposes of explanation, specific configurations and details are set forth in order to provide a thorough understanding of the embodiments. However, the present invention can be practiced without the specific details. Furthermore, well-known features may be omitted or simplified in order not to obscure the embodiment being described.

Figure 1:
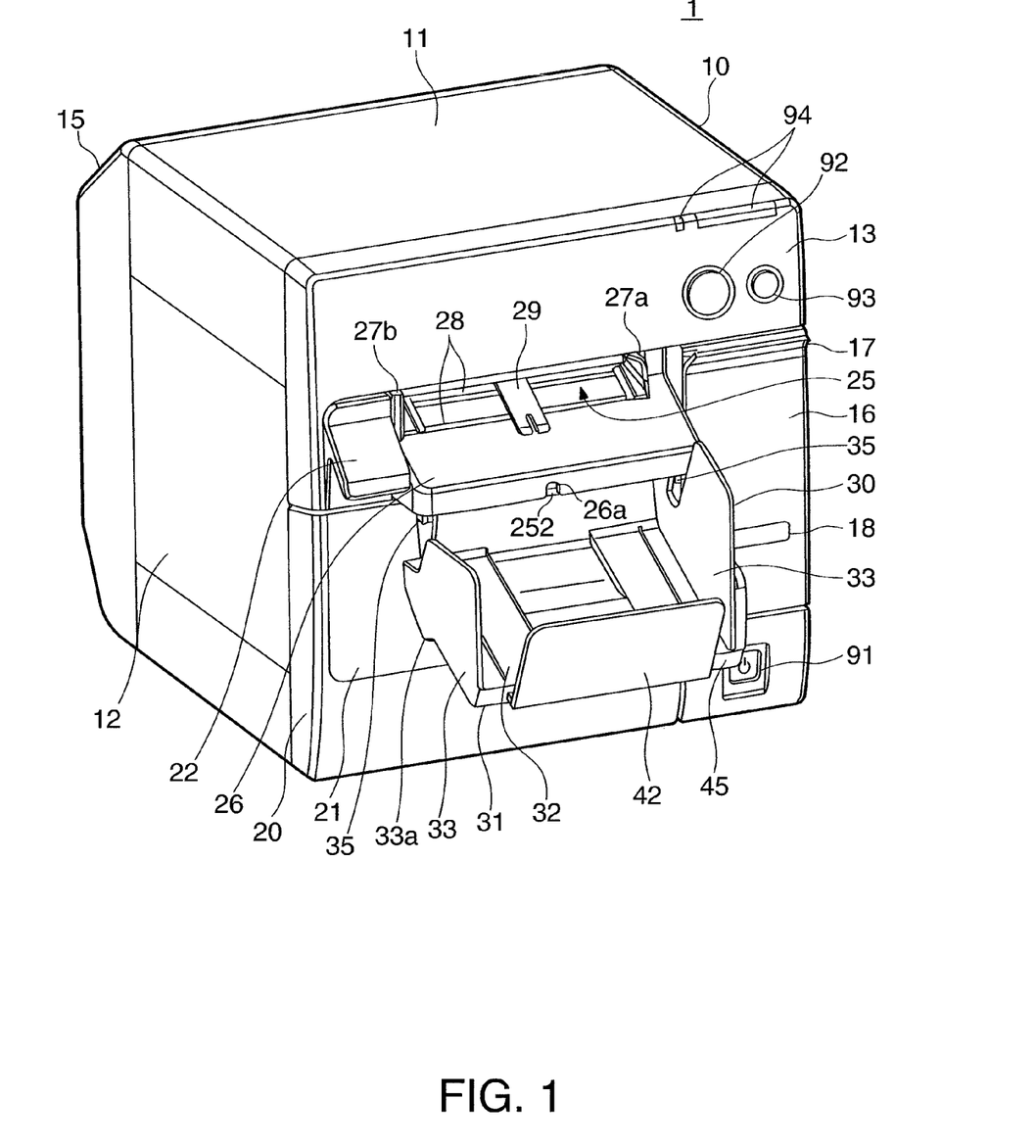
FIG. 1 is an oblique view of an inkjet printer in accordance with many embodiments.
Figure 2:
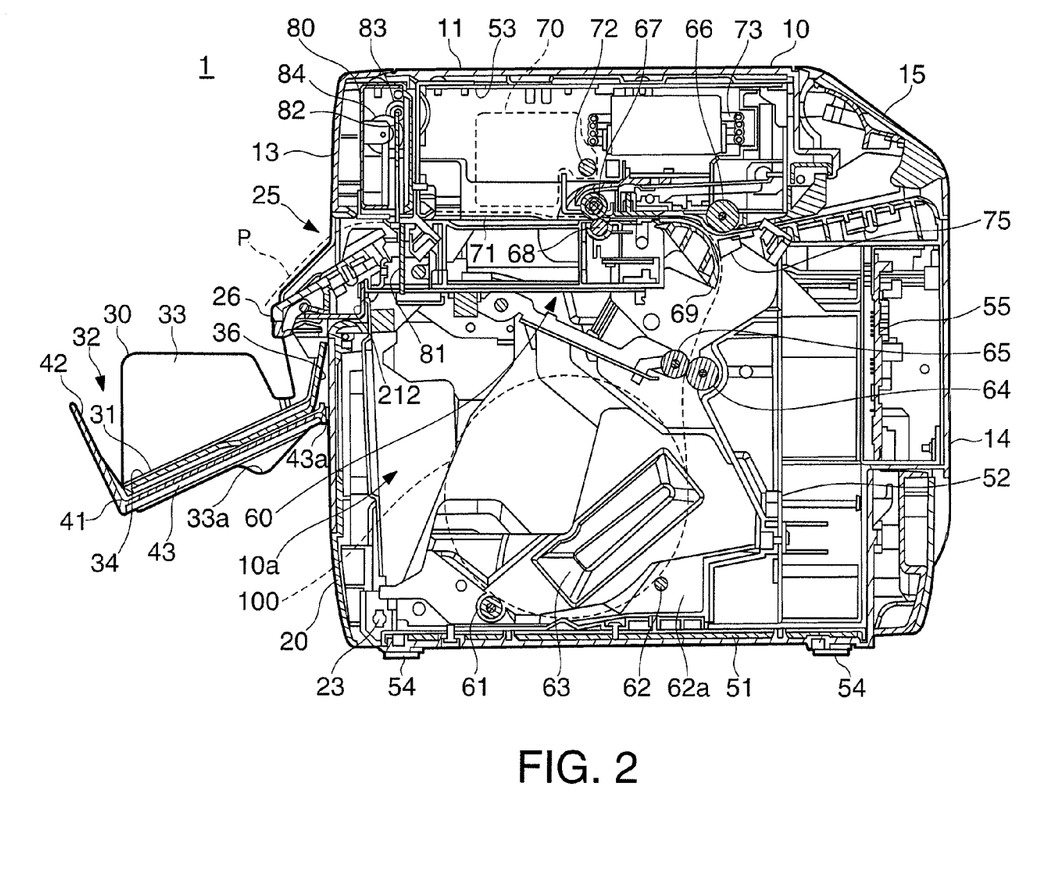
FIG. 2 is a section view of the inkjet printer of FIG. 1.

Referring now to the drawings, in which like reference numerals represent like parts throughout the several views, FIG. 1 shows an inkjet printer 1 in accordance with embodiments. FIG. 2 shows a section view of the inkjet printer 1. Note that in FIG. 2 the transportation path P of the roll paper 100 is indicated by an imaginary (dashed) line.

The inkjet printer 1 (referred to as simply "printer 1" below) uses roll paper 100 as the recording medium, and prints (records) images, including text, by discharging and depositing ink on the surface of the roll paper 100. The roll paper 100 is a sheet of paper or plastic, for example, wound into a roll.

The sheet used in the roll paper 100 can have a plastic coating on the sheet surface, or label paper having label stock with an adhesive coating on the back carried on a web liner. In many embodiments, the roll paper 100 used in the printer 1 is label paper.

The printer 1 records an image on the roll paper 100, and then discharges the printed paper from a paper exit 25 located in the front of the printer 1. A cutter unit 80 (FIG. 2) is disposed before the paper exit 25 in the printer 1. The cutter unit 80 cuts the roll paper 100 to a specified length, and the portion that is cut off is discharged from the paper exit 25. The printer 1 can therefore print and output labels made by cutting the label paper to a specified length.

As shown in FIG. 1, the printer 1 has a basically box-shaped case 10. The top of the case 10 is covered by a top panel 11. Side panels 12 are disposed on the left and right sides of the case 10. And a back panel 14 (FIG. 2) is disposed to the back of the case 10 perpendicularly to a surface on which the printer 1 is placed.

A back top panel 15 is disposed connecting the top and back surfaces at the top back end of the case 10. A front top panel 13 is disposed at the top front part of the case 10. An ink cartridge loading door 16 and a roll paper cover 20 are disposed side by side below the front top panel 13.

The ink cartridge loading door 16 can open and close relative to the case 10 via a hinge (not shown in the figure) at the bottom end thereof. A storage unit in which an ink cartridge (not shown in the figure) is held is located inside the ink cartridge loading door 16. Ink cartridges can be loaded and removed by opening the ink cartridge loading door 16. A catch 17 that a user can grasp when opening and closing the door is disposed at the top of the ink cartridge loading door 16. And a transparent window 18 is disposed in the bottom part of the ink cartridge loading door 16 for checking if an ink cartridge is loaded.

The roll paper cover 20 (access cover) opens and closes by pivoting forward at the bottom end thereof. When the roll paper cover 20 is open, a roll paper compartment 10a, which is a space used as a recording medium storage unit for storing the roll paper 100 inside the printer 1, is exposed (see FIG. 2). And the roll paper 100 can be loaded and replaced from the front of the printer 1.

The paper exit 25 is located at the top part of the roll paper cover 20 at a place between the roll paper cover 20 and the front top panel 13. The paper exit 25 is a horizontally oriented narrow opening configured to accommodate the width of the roll paper 100. An exit paper guide 26 (guide member) connected to the bottom end of the paper exit 25 is coupled with the roll paper cover 20. The exit paper guide 26 has a slope (guide surface) that supports the roll paper 100 discharged from the paper exit 25 from below. A pair of paper width guides 27a, 27b (side guide members) are positioned at the top end of the guide surface to guide the roll paper 100 from opposite sides of the paper width. The paper width guides 27a, 27b restrict and guide the position of the width of the roll paper 100 in the exit paper guide 26.

A discharge tray unit 30 (external member) that receives the roll paper 100 descending along the exit paper guide 26 is disposed below the exit paper guide 26.

The discharge tray unit 30 includes a discharge tray 31 forming part of a receiving unit 32 in which the roll paper 100 is stored at a position below the exit paper guide 26, and a sliding member 41 that is slidably attached to the discharge tray 31. Engaging pins 35 (a hinge) are coupled with the top part of the discharge tray 31, and these engaging pins 35 engage bearings (not shown in the figure) coupled with the roll paper cover 20. The discharge tray unit 30 is thus attached so that it can pivot freely on the engaging pins 35 relative to the front of the roll paper cover 20.

The receiving unit 32 of the discharge tray 31 is the space defined by a downward slope (similar to the exit paper guide 26), a pair of side walls 33 rising from opposite sides of this slope, and a paper stop 42. The paper stop 42 is coupled with the bottom end of the sliding member 41. and prevents the roll paper 100 from falling out of the receiving unit 32. By sliding the sliding member 41 on the discharge tray 31, the paper stop 42 can be moved to change the length of the receiving unit 32.

As described above, a portion of the roll paper 100 cut-off by the cutter unit 80 is discharged from the paper exit 25. The cut-off portion moves down along the slope of the exit paper guide 26, and drops into the receiving unit 32. In some circumstances, the cut-off portion of the roll paper 100 may have a tendency to turn when it drops into the receiving unit 32 from the bottom end of the slope of the exit paper guide 26. Advantageously, by adjusting the length of the receiving unit 32 to a suitable length, the cut-off portions of the roll paper 100 can collect in the receiving unit 32 without turning over. Because the cut-off portions of the roll paper 100 do not turn over and are left with the side having the printed image facing up, the printed image can be checked as the cut-off portions accumulate in the receiving unit 32.

As shown in FIG. 2, when the sliding member 41 is slid all the way in to the case 10, the distal end 43a of the sliding member 41 touches the front of the roll paper cover 20. When the sliding member 41 is pulled forward from the discharge tray 31, the distal end 43a moves away from the front of the roll paper cover 20, and the printer-side slope 36 of the discharge tray 31 touches the front of the roll paper cover 20.

The angle of the paper collection surface 34 to the installation surface (e.g., horizontal surface of a desktop supporting the printer) of the printer 1 is small when the distal end 43a is touching the roll paper cover 20, and is slightly greater when the printer-side slope 36 is touching the roll paper cover 20.

More specifically, when the paper stop 42 is positioned at the top (as illustrated in FIG. 2), the distal end 43a contacts the roll paper cover 20, and the angle of the paper collection surface 34 is small. This position is suitable for receiving the roll paper 100 cut-offs when they are cut to a short length. Because the paper stop 42 is close to the paper exit 25 and the angle of the paper collection surface 34 is small, the roll paper 100 cut-offs are less likely turn over or fall out of the receiving unit 32.

When the sliding member 41 is pulled down, the distal end 43a separates from the roll paper cover 20 and the angle of the paper collection surface 34 becomes steeper. This position is suitable for receiving long cut-offs of roll paper 100 because the receiving unit 32 is correspondingly long. Because the angle of the paper collection surface 34 is steep, long cut-off portions are less likely to jam up near the paper exit 25 and may more reliably drop to the position of the paper stop 42.

The discharge tray unit 30 is thus configured so that the angle of the paper collection surface 34 changes automatically as a result of sliding the sliding member 41 to change the length of the receiving unit 32.

The bottom end of the roll paper cover 20 is supported so that it can pivot relative to the case 10 of the printer 1 on a hinge unit 23 (FIG. 2), and can open so that the front of the roll paper cover 20 rotates facing down. The roll paper cover 20 is held in the closed position by a locking mechanism (not shown). When a release lever 22 disposed at the top end of the roll paper cover 20 is operated, the lock mechanism is released and the roll paper cover 20 can be opened.

As shown in FIG. 2, the case 10 of the printer 1 has a frame including a bottom frame 51, a back frame 52, and a top frame 53. The bottom frame 51 is a frame panel that supports the bottom part of the printer 1. A plurality of feet 54 that contact the installation surface are affixed to the bottom frame 51. The back frame 52 rises from the bottom frame 51. The top frame 53 is affixed to the top part of the back frame 52. A control circuit board 55, on which various control circuits and devices that control the printer 1 are disposed, is supported on the back side of the back frame 52.

The roll paper compartment 10a (in which the roll paper 100 is stored) is a space reserved between the bottom frame 51 and the top frame 53. A roll paper support roller 61 and a roll paper support bar 62 are disposed at the bottom of the roll paper compartment 10a.

The roll paper support roller 61 is disposed freely rotatably to the frame of the case 10, and together with the roll paper support bar 62 supports the roll paper 100 from the bottom so that the roll paper 100 can rotate easily. Roll paper pressers 63 that contact the sides of the roll paper 100 and stabilize the roll paper 100 are disposed on the left and right sides of the roll paper compartment 10a.

The roll paper support bar 62 is supported by a pair of roll paper guides 62a (internal side guide members). The roll paper guides 62a are disposed on the left and right sides in the roll paper compartment 10a, and can move along the roll paper support bar 62 to match the width of the roll paper 100. The roll paper guides 62a limit the position of the width of the roll paper 100 relative to the center of the width of the transportation path P, and enable stable conveyance of the roll paper 100.

A first transportation roller 64 and a second transportation roller 65 are disposed in opposition at the top part of the roll paper compartment 10a, and convey the roll paper 100 that is pulled up therebetween. The first transportation roller 64 is driven by a transportation motor (not shown in the figure), and the second transportation roller 65 is a follower that follows the rotation of the first transportation roller 64.

A paper guide 69 that redirects the roll paper 100 to the front is disposed above the first transportation roller 64 and second transportation roller 65. A third transportation roller 66 is disposed opposite the paper guide 69. The third transportation roller 66 is driven by the transportation motor (not shown in the figure) noted above, and conveys the roll paper 100 forward.

A paper support unit 60 is disposed in front of the paper guide 69. The paper support unit 60 is supported by the top frame 53, and includes components that execute recording an image on the roll paper 100 and discharging the paper from the paper exit 25.

The paper support unit 60 includes a fourth transportation roller 67 and a fifth transportation roller 68 for transporting the roll paper 100 that is conveyed forward by the third transportation roller 66, a platen 71 that supports the roll paper 100 from below, a recording head 70 that discharges ink to and records images on the roll paper 100 from above the platen 71, and the cutter unit 80 that cuts the roll paper 100 on which is an image has been recorded by the recording head 70.

The fourth transportation roller 67 is positioned above the transportation path P. And the fifth transportation roller 68 is disposed below the transportation path P of the roll paper 100 so that the rollers are in opposition. The fifth transportation roller 68 is driven by the foregoing transportation motor (not shown in the figure). And the fourth transportation roller 67 is a follower roller that follows the fifth transportation roller 68.

A guide shaft 72 that extends widthwise to the case 10 is disposed above the fourth transportation roller 67 and fifth transportation roller 68. The recording head 70 travels on the guide shaft 72 bidirectionally across the width of the roll paper 100 when a head drive motor (not shown in the figure) is operated.

The recording head 70 is normally at a standby position adjacent the ink cartridge loading door 16 (FIG. 1) side when not printing, and is denoted by an imaginary line (dashed line) in FIG. 2.

The recording head 70 is an inkjet recording head that discharges ink onto the surface of the roll paper 100 to record images. More specifically, ink supplied through an ink supply tube 73 from an ink cartridge (not shown in the figure) stored behind the ink cartridge loading door 16 is discharged onto the roll paper 100 from nozzles by means of a discharge mechanism using a piezoelectric device, for example.

The roll paper 100 passing between the recording head 70 and platen 71 is conveyed forward through the transportation path P by the transportation force of the fourth transportation roller 67 and fifth transportation roller 68 to the cutter unit 80.

The cutter unit 80 includes a fixed knife 81 that is disposed inset below the transportation path P, and a movable knife 82 that is disposed above the transportation path P to slide against the fixed knife 81. The roll paper 100 is disposed between the fixed knife 81 and movable knife 82, which cut through both the label stock and the liner of the roll paper 100.

A cutter drive motor 83 and a cutter drive roller 84 that causes the movable knife 82 to move up and down using the torque of the cutter drive motor 83 are coupled with the movable knife 82. And the roll paper 100 is cut by the operation of the cutter drive motor 83 and the cutter drive roller 84.

When the roll paper 100 is cut by the cutter unit 80 and the leading end of the roll paper 100 is outside the paper exit 25, gravity causes the cut-off portion of the cut roll paper 100 to drop onto the exit paper guide 26.

The control circuits mounted on the control circuit board 55 drive the transportation motor (not shown in the figure), the head drive motor (not shown in the figure), the discharge mechanism of the recording head 70, and the cutter drive motor 83 of the printer 1, and control the operating sequences related to conveying the roll paper 100, recording images on the roll paper 100, and cutting the roll paper 100.

In addition, as shown in FIG. 1, a power switch 91 for turning the power of the printer 1 on and off is disposed below the ink cartridge loading door 16. A cut button 92 for cutting the roll paper 100 by means of the cutter unit 80 (FIG. 2), and a feed button 93 for advancing the roll paper 100 a desired length, are located on the front top panel 13.

The control circuit mounted on the control circuit board 55 starts operating when the power switch 91 is operated and the power turns on, exchanges data and control signals with a host computer, for example, externally connected to the printer 1, and records images on the roll paper 100 as controlled by the host computer.

When the cut button 92 is operated, the control circuit operates the cutter drive motor 83 separately from cutting operations controlled by the host computer. When the feed button 93 is operated, the control circuit operates the transportation motor (not shown in the figure) for as long as the feed button 93 is held depressed separately from paper feed operations controlled by the host computer.

An indicator 94 such as shown in FIG. 1 is also disposed at the front of the printer 1. The indicator 94 includes a plurality of LEDs. And the control circuit mounted on the control circuit board 55 displays and outputs various messages, such as the operating status of the printer 1 and ink cartridge and replacement prompts, by changing the illumination state of the LEDs of the indicator 94 to light steady, blink, or turn off appropriately.

Figure 3:
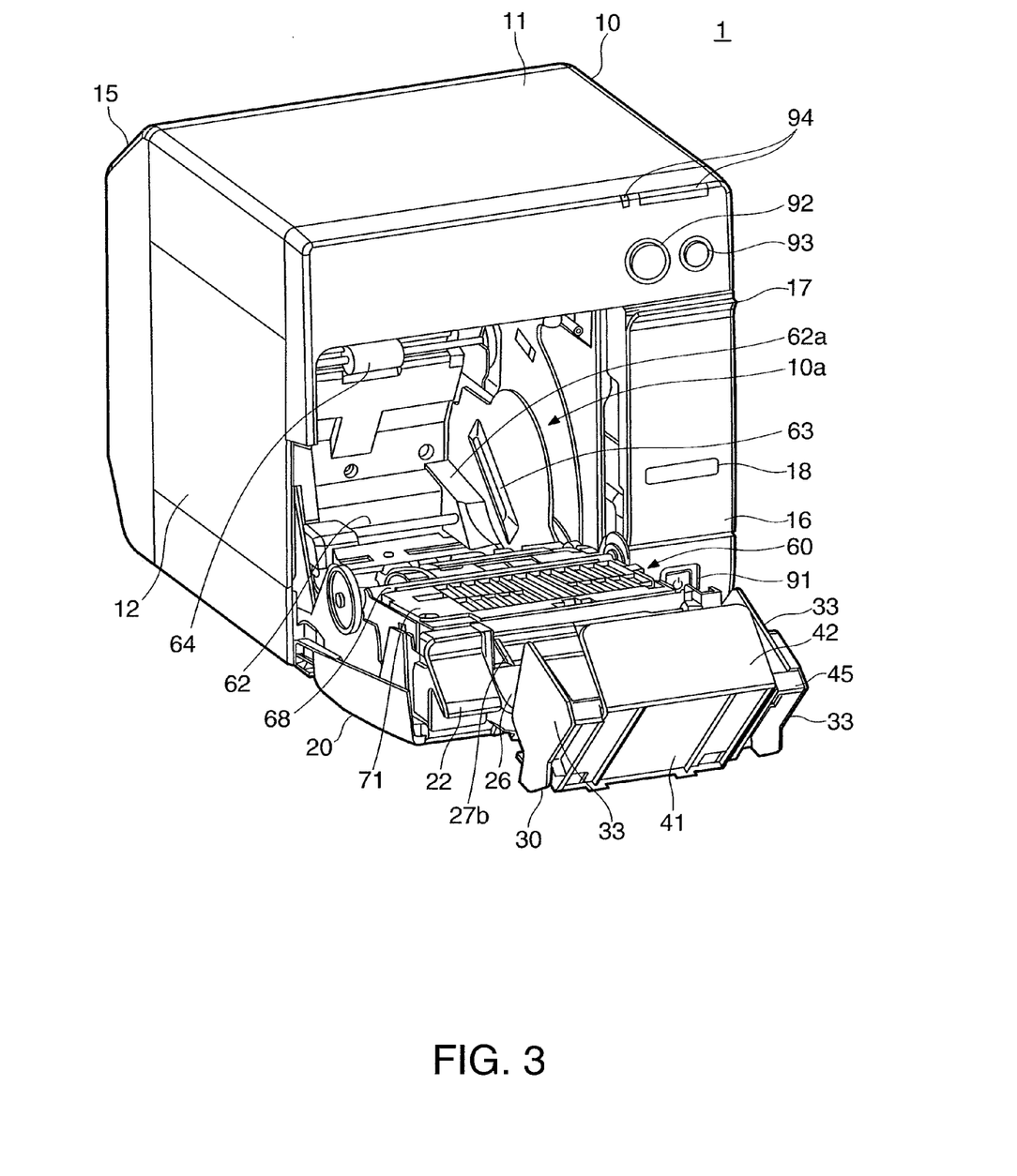
FIG. 3 is an oblique view of the inkjet printer of FIG. 1 with a roll paper compartment cover open.

FIG. 3 is an oblique view of the printer 1 with the roll paper cover 20 open.

When the release lever 22 is operated and the lock is released, the roll paper cover 20 of the printer 1 pivots forward on the bottom end thereof and opens as shown in FIG. 3. When open as shown in FIG. 3, the second transportation roller 65, the fifth transportation roller 68, the paper guide 69, and the platen 71 move forward with the roll paper cover 20, and the roll paper compartment 10a is exposed.

To load the roll paper 100, the roll paper 100 is inserted into the roll paper compartment 10a that is open as shown in FIG. 3, the leading end of the roll paper 100 is pulled out and placed on the fifth transportation roller 68 and platen 71, and the roll paper cover 20 is then closed.

When the roll paper cover 20 closes, the roll paper 100 is held between the platen 71 and the recording head 70, between the fifth transportation roller 68 and the fourth transportation roller 67, between the paper guide 69 and the third transportation roller 66, and between the second transportation roller 65 and the first transportation roller 64. The roll paper 100 can thus be easily loaded in the transportation path P of the printer 1 shown in FIG. 2 by simply inserting the roll paper 100 with a leader pulled out into the roll paper compartment 10a, and then closing the roll paper cover 20.

Because the roll paper cover 20 pivots and drops forward when opened as shown in FIG. 3, the discharge tray unit 30 coupled with the roll paper cover 20 contacts the installation surface of the printer 1. Note that the discharge tray unit 30 pivots easily even after contacting the installation surface of the printer 1 so that there is no interference with opening the roll paper cover 20.

Figure 4:
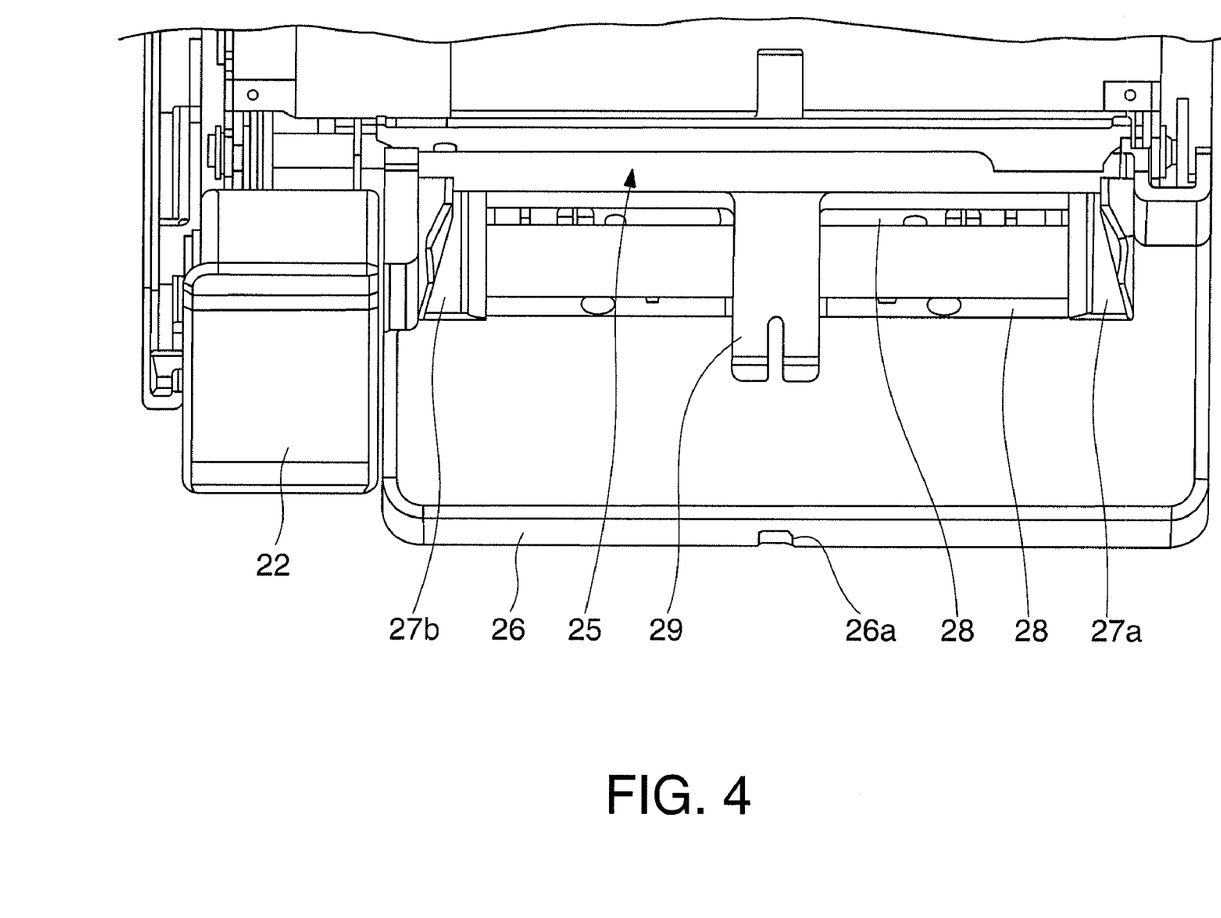
FIGS. 4 and 5 are enlarged plan views of main parts near the paper exit of the printer of FIG. 1.
Figure 5:
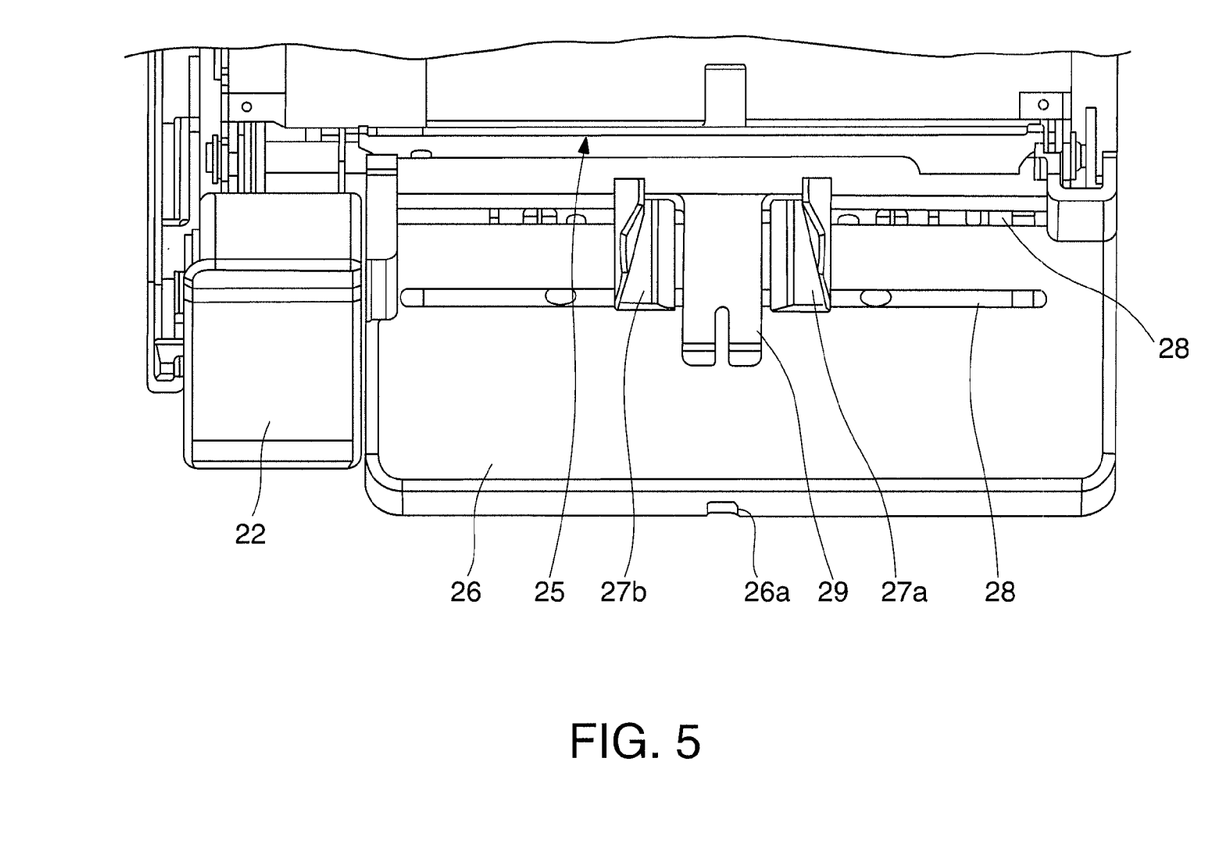

FIG. 4 and FIG. 5 are enlarged plan views of the area near the paper exit 25.

As described above, a pair of left and right paper width guides 27a, 27b are coupled with the exit paper guide 26. And both the paper width guide 27a and the paper width guide 27b can move widthwise to the roll paper 100 relative to the exit paper guide 26. Channels 28 configured to accommodate the movement of the paper width guides 27a, 27b extend in the sloped surface of the exit paper guide 26 across the width of the roll paper 100.

A paper guide plate 29 is disposed to the exit paper guide 26 bridging the channel 28 between the pair of paper width guides 27a, 27b. The roll paper 100 is discharged on top of the paper guide plate 29.

The paper width guides 27a, 27b can be moved relative to the exit paper guide 26 to adjust to the width of the roll paper 100, and can be moved to the side ends of the exit paper guide 26 as shown in FIG. 4, or to the middle as shown in FIG. 5.

The paper width guides 27a, 27b are supported to move symmetrically left and right by the operation of a support mechanism housed inside the exit paper guide 26. When one of the paper width guides 27a, 27b is moved, the other also moves in conjunction therewith.

Figure 6:
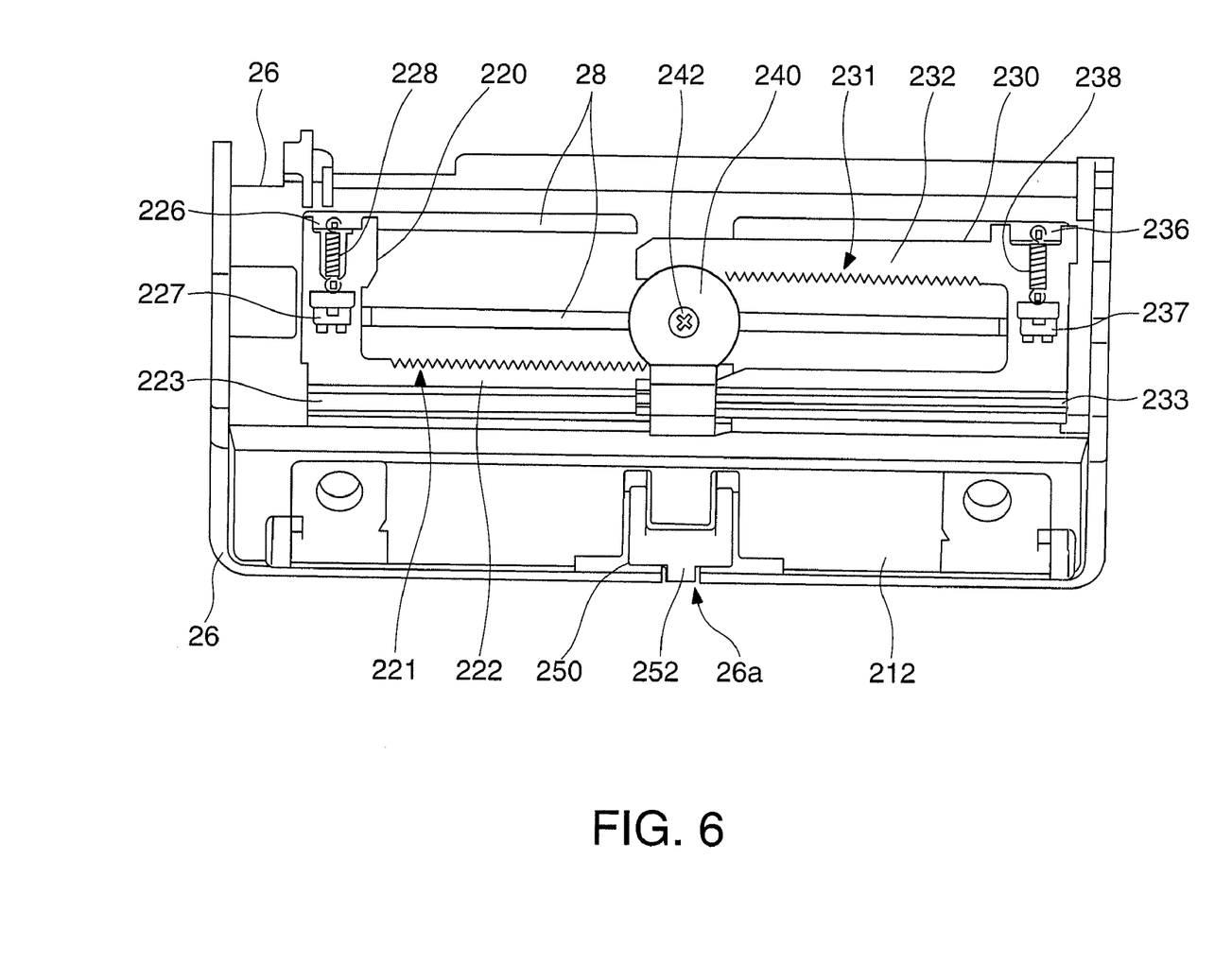
FIG. 6 shows the configuration of the support mechanism of the paper width guide of the printer of FIG. 1.
Figure 7:
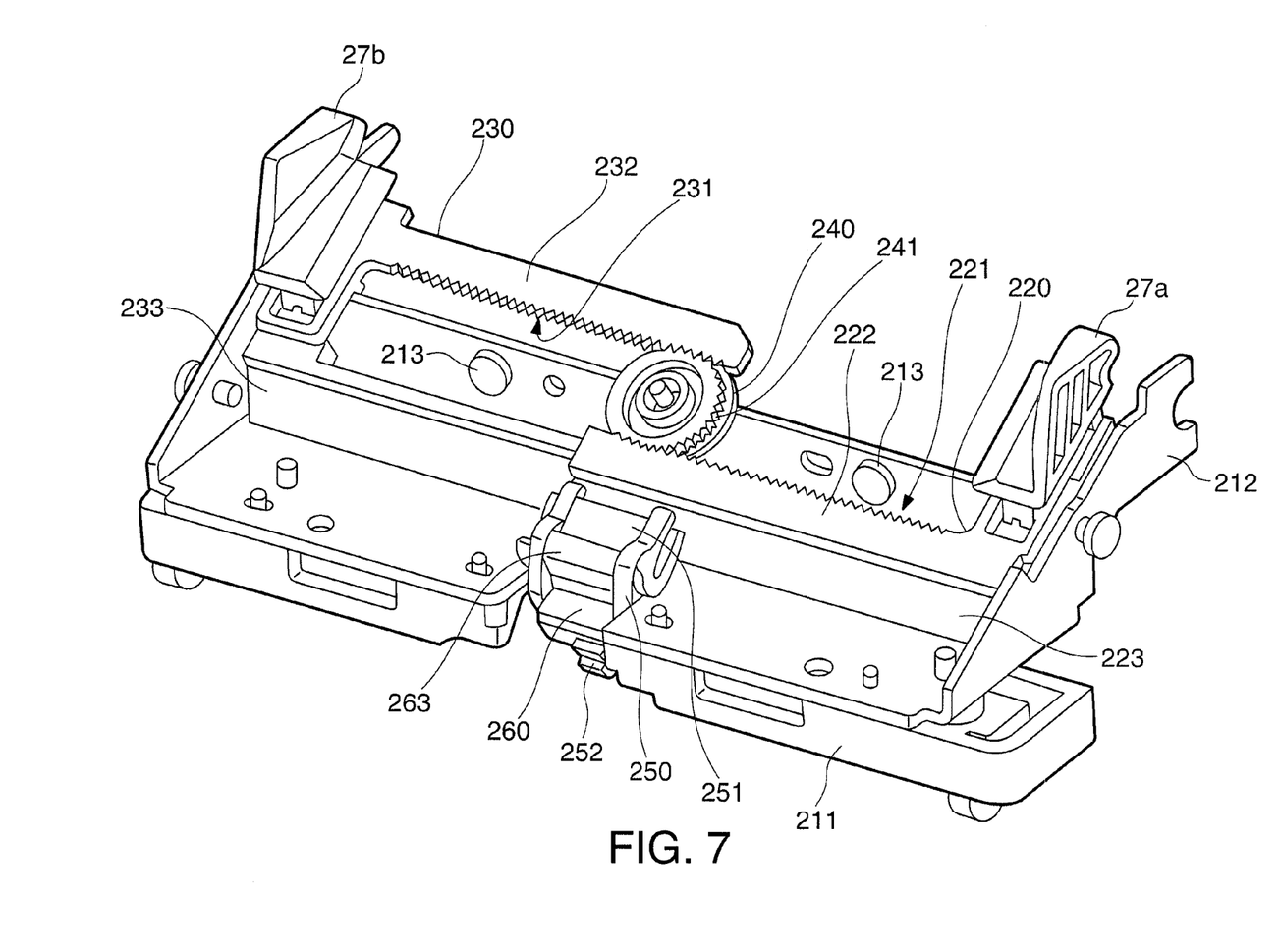
FIG. 7 is an oblique view of main parts in the configuration of the paper width guide support mechanism of the printer of FIG. 1.
Figure 8:
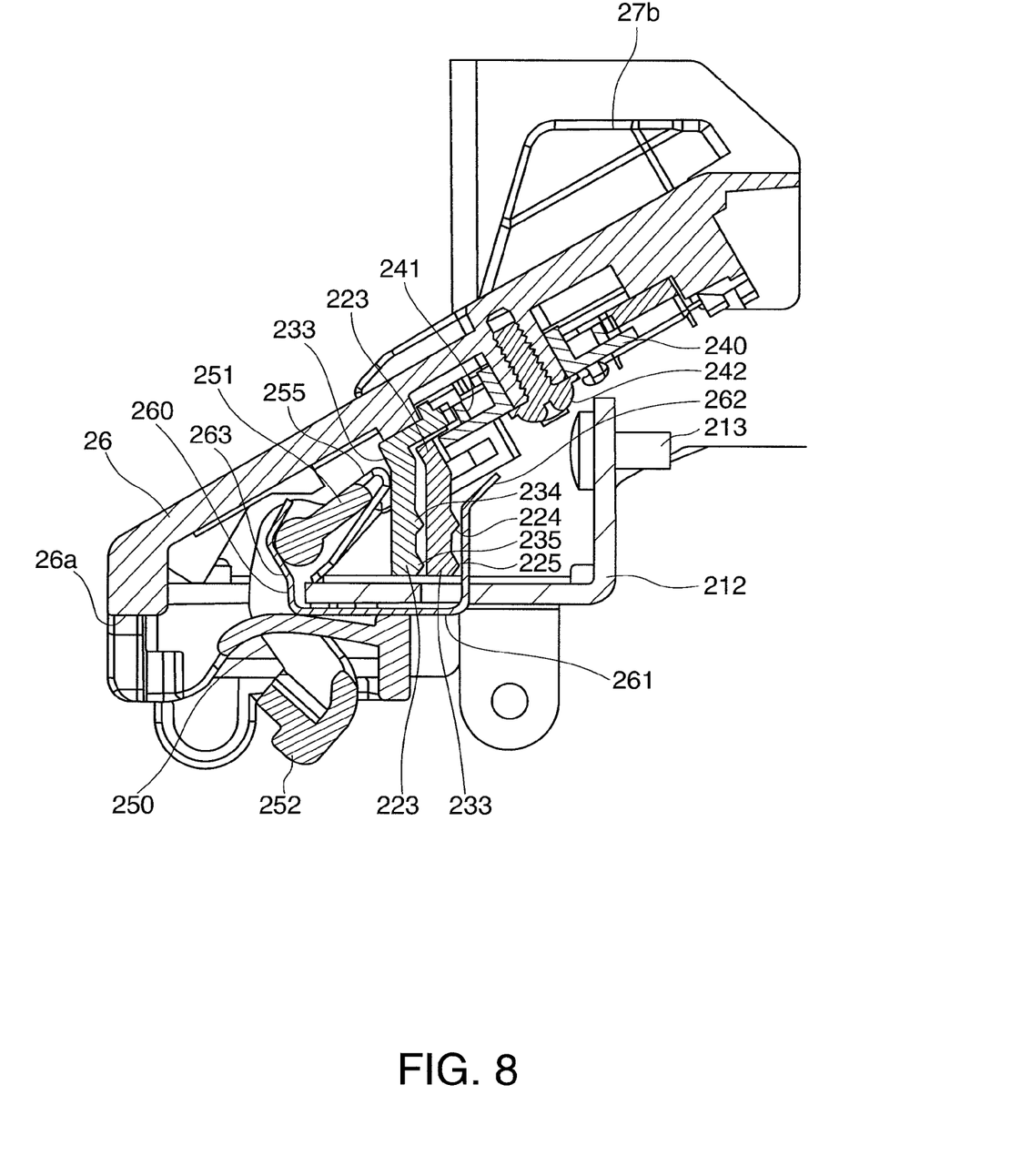
FIG. 8 is a section view of main parts near the paper exit of the printer of FIG. 1.

FIG. 6 shows the configuration of the support mechanism of the paper width guides 27a, 27b, and is a view of the exit paper guide 26 from below (the back side). FIG. 7 is an oblique view showing the main parts of the support mechanism for the paper width guides 27a, 27b. And FIG. 8 is a section view showing the main parts of the support mechanism near the paper exit 25. In FIG. 7 and FIG. 8 the paper width guides 27a, 27b are not locked.

As shown in FIG. 6 to FIG. 8, a frame 212 and a base 211 that is attached to the frame 212 and supports the bottom part of the exit paper guide 26 are disposed to the paper exit 25 inside the exit paper guide 26, which provides the guide surface that guides the roll paper 100.

The frame 212 is fastened by screws 213 to the frame of the case 10 rendering the paper support unit 60 (FIG. 2), and the frame 212 supports the exit paper guide 26.

As shown in FIG. 6 and FIG. 7, a sliding member 220 that supports the paper width guide 27a, and a sliding member 230 that supports the paper width guide 27b, are housed inside the exit paper guide 26.

The sliding member 220 has an arm 222 and a wall part 223 that extend parallel to each other along the width of the roll paper 100. The arm 222 is a flat member that is parallel to the slope of the exit paper guide 26, and has a rack 221 formed on one long side. The wall part 223 is a panel member that is vertically oriented when the printer 1 is set for use.

The sliding member 230 has an arm 232 and a wall part 233 that extend parallel to each other along the width of the roll paper 100. The arm 232 is a flat member that is parallel to the slope of the exit paper guide 26, and has a rack 231 formed on one long side. The wall part 233 is a panel member that is vertically oriented when the printer 1 is set for use.

As shown in FIG. 6, the sliding member 220 is linked to the paper width guide 27a through coupling units 226 and 227. The one coupling unit 226 passes through the top channel 28, and connects the paper width guide 27a positioned on the front side of the exit paper guide 26 with the sliding member 220 positioned inside the exit paper guide 26. The other coupling unit 227 passes through the bottom channel 28, and couples the paper width guide 27a and the sliding member 220. The sliding member 220 is thus connected in unison with the paper width guide 27a via couplings that pass through the channel 28 in the exit paper guide 26 and can move freely along the channel 28 in the exit paper guide 26.

The sliding member 230 is linked to the paper width guide 27b through coupling units 236 and 237. The coupling unit 236 passes through the top channel 28 and connects the paper width guide 27b with the sliding member 230. The other coupling unit 237 passes through the bottom channel 28 and couples the paper width guide 27b with the sliding member 230. The sliding member 230 is thus connected in unison with the paper width guide 27b via couplings that pass through the channel 28 in the exit paper guide 26 and can move freely along the channel 28 in the exit paper guide 26.

As shown in FIG. 7, the arm 222 is positioned below the arm 232. And the rack 221 and the rack 231 are formed so that they are facing each other. A middle gear 240 is disposed between the arm 222 and the arm 232.

The middle gear 240 is fastened by a screw 242 (FIG. 6, FIG. 8) to the back side of the exit paper guide 26 so that the middle gear 240 can rotate freely. A gear 241 is formed around the circumference of the middle gear 240. And the gear 241 is meshed with the racks 221 and 231.

As described above, the sliding members 220 and 230 can move along the channels 28, and the middle gear 240 turns when the sliding members 220 and 230 move. In addition, when one of the sliding members 220 and 230 moves, the other sliding member is moved in the opposite direction via the middle gear 240.

For example, when the paper width guide 27a is moved from the position shown in FIG. 7 to the center of the exit paper guide 26, the sliding member 220 moves with the paper width guide 27a, and the middle gear 240 turns. The direction of rotation for this movement is clockwise as seen in FIG. 7. As the middle gear 240 turns, the other rack 231 meshed with the gear 241 is driven and the other sliding member 230 moves to the right as seen in FIG. 7. More particularly, when one paper width guide 27a is moved toward the middle gear 240, the other paper width guide 27b also moves in conjunction therewith toward the middle gear 240. The opposite is similar. That is, when the one paper width guide 27a is moved away from the middle gear 240, the other paper width guide 27b also moves away from the middle gear 240. Yet further, when paper width guide 27b is moved, paper width guide 27a also moves in conjunction therewith.

As described above, when one of the paper width guides 27a, 27b is moved, the other guide also moves in conjunction therewith, and the paper width guides 27a, 27b move left and right symmetrically relative to the middle gear 240. As a result, by moving the paper width guides 27a, 27b to match the width of the roll paper 100, the position of the roll paper 100 is limited by the paper width guides 27a, 27b to a position in the middle of the width of the exit paper guide 26, and the center of the width of the roll paper 100 is always over the center (that is, the position of the screw 242) of the exit paper guide 26.

As shown in FIG. 7 and FIG. 8, a flat spring 260 is disposed passing through the frame 212 in the center of the width of the exit paper guide 26. A pressure member 250 is supported by this flat spring 260. In many embodiments, the flat spring 260 is made by bending steel sheet with the desired elasticity into the desired shape. In many embodiments, the flat spring 260 has an approximately U-shaped configuration when seen in section, including a flat part 261 formed to a horizontal surface, a support part 262 that rises from one end of this flat part 261, and an engaging part 263 that rises from the other end.

The flat part 261 is disposed along the bottom of the frame 212 at a position below the frame 212, and the support part 262 and engaging part 263 extend upward passing through the bottom of the frame 212.

The wall part 223 and the wall part 233 are disposed overlapping each other as panel units between the support part 262 and the engaging part 263 on top of the bottom of the frame 212. The wall part 223 faces the support part 262, and the wall part 233 overlaps the wall part 223.

A flat pressure spring 255 that contacts and applies pressure to the wall part 233 is also disposed between the support part 262 and the engaging part 263. The pressure spring 255 is a flat spring that is bent into a basic V-shape, and is disposed with the end part touching one side of the wall part 233. The pressure spring 255 is displaced in conjunction with operating the pressure member 250 as described below, and pushes the wall part 233 toward the wall part 223.

The pressure member 250 is disposed in the center of the width of the exit paper guide 26. And the pressure member 250 has an engaging part 251 that is fit between the engaging part 263 and the pressure spring 255, and an operating part 252 (operating unit) that protrudes below the exit paper guide 26.

The engaging part 251 is fit between the pressure spring 255 and a recessed part formed in the engaging part 263, and is supported to pivot in this space. The pressure member 250 and the engaging part 251 can pivot relative to the engaging part 263.

The support mechanism of the paper width guides 27a, 27b thus includes the frame 212, the sliding members 220 and 230 coupled to the paper width guides 27a, 27b, a middle gear 240, a pressure member 250, and a flat spring 260. The coupling units 226, 227, 236, 237, coil springs 228 and 238, and the base 211 can also be included in the support mechanism.

Figure 9:
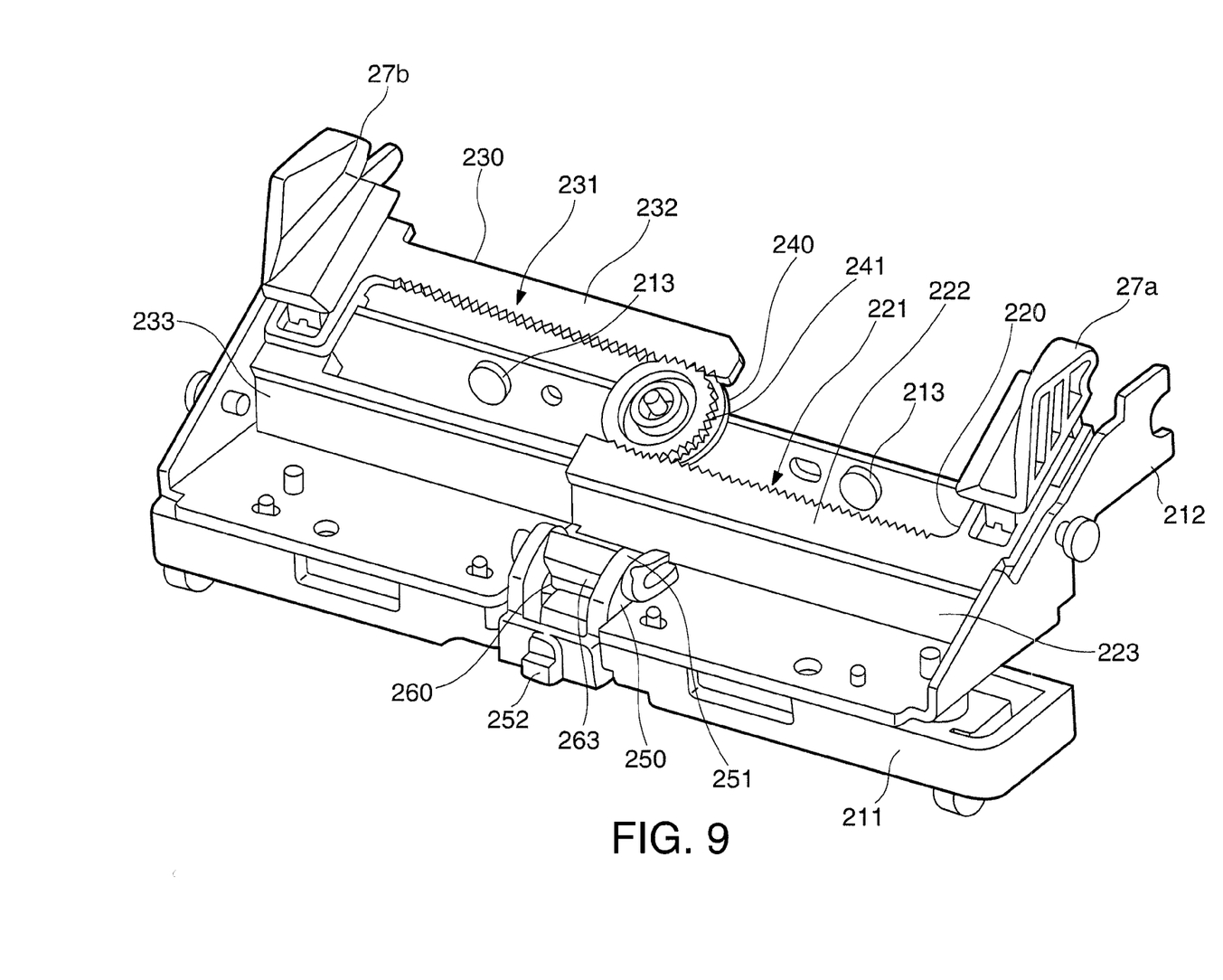
FIG. 9 is a section view of main parts in the configuration of the paper width guide support mechanism of the printer of FIG. 1.
Figure 10:
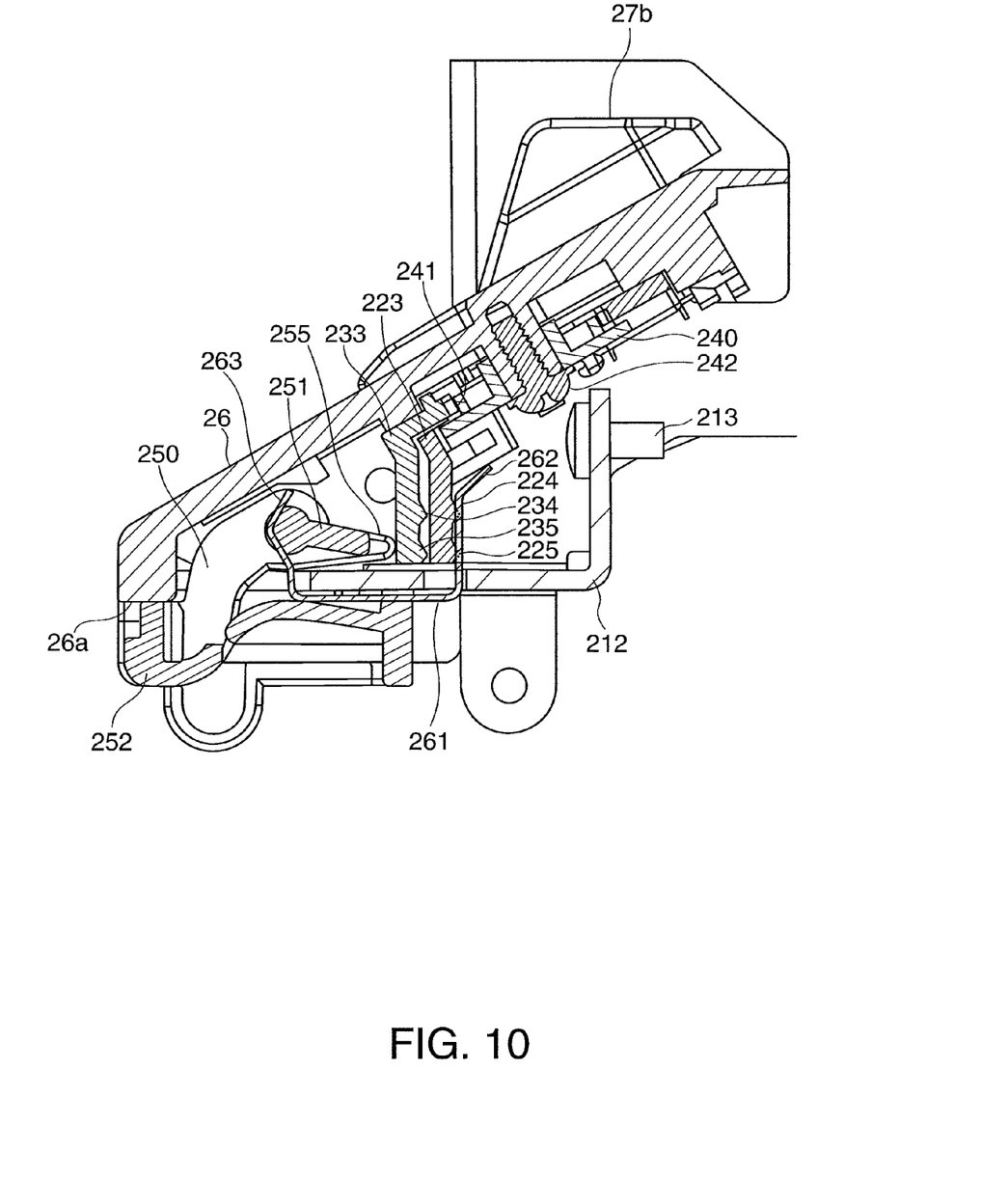
FIG. 10 is a section view of main parts near the paper exit of the printer of FIG. 1.

FIG. 9 is an oblique view showing the main components of the support mechanism for the paper width guides 27a, 27b. FIG. 10 is a section view of the main components of the support mechanism near the paper exit 25. FIG. 9 and FIG. 10 show the paper width guides 27a, 27b when secured so that they do not move.

When the pressure member 250 is turned clockwise from the position shown in FIG. 8, the engaging part 251 goes to a substantially horizontal position as shown in FIG. 10. And the wall part 233 is pushed against the wall part 223 by the pressure spring 255. And the wall part 233 and the wall part 223 are pushed against the support part 262 by the pressure spring 255, and are thus prevented from sliding easily.

A top rib 234 and a bottom rib 235 are formed on a side surface of the wall part 223 as protrusions extending along the length of the wall part 233.

A top rib 224 and a bottom rib 225 are formed on a side surface of the wall part 223 as protrusions extending along the length of the wall part 223.

As a result, when the pressure spring 255 is displaced and presses against the wall part 233, the wall parts 233, 223 and the support part 262 are pressed together through the intervening top ribs 234, 224 and bottom ribs 235, 225. Friction is increased by concentrating pressure at the ribs And the wall part 233 and wall part 223 are secured so that they do not slide along the channels 28.

More specifically, in the position shown in FIG. 9 and FIG. 10, the sliding members 220 and 230 are locked so that they do not slide.

When the sliding members 220 and 230 are locked as shown in FIG. 9 and FIG. 10, the operating part 252 of the pressure member 250 enters a recessed part 26a formed in the center of the width of the exit paper guide 26. Because the recessed part 26a is exposed at the front of the printer 1 as shown in FIG. 4, the operating part 252 can be operated to apply pressure by means of a jig that can enter the recessed part 26a.

When the operating part 252 is pushed down from the position shown in FIG. 9 and FIG. 10, the pressure member 250 pivots on the engaging part 263 and returns to the position shown in FIG. 7 and FIG. 8. In this position the pressure from the pressure spring 255 is released, and the sliding member 220 and sliding member 230 can slide.

In order to operate the operating part 252 again to lock the sliding members 220 and 230, the operating part 252 can be simply pushed up. Because the operating part 252 protrudes below the exit paper guide 26 when the sliding members 220 and 230 are unlocked as shown in FIG. 8, pushing the operating part 252 up is simple.

As described above, the printer 1 is a printer 1 that records images on and discharges roll paper 100 from a paper exit 25. The printer 1 has an exit paper guide 26 that guides roll paper 100 discharged from the paper exit 25; a pair of paper width guides 27a, 27b that restrict the widthwise position of the roll paper 100 on the exit paper guide 26; and a support mechanism that supports the paper width guides 27a, 27b movably widthwise to the roll paper 100 and secures the paper width guides 27a, 27b in a desired position. The support mechanism has a pair of sliding members 220 and 230 that slide in conjunction with the pair of paper width guides 27a, 27b; and a pressure member 250 that applies pressure to the wall parts 223, 233 at a position where the wall parts 223, 233 of the pair of sliding members 220 and 230 overlap. A recessed part 26a is rendered in the exit paper guide 26. And the operating part 252 of the pressure member 250 is exposed from this recessed part 26a. When the pressure member 250 is displaced by operating the operating part 252, the paper width guides 27a, 27b are released from being locked by the support mechanism.

As a result, the paper width guides 27a, 27b can be unlocked by operating the operating part 252 of the pressure member 250 exposed from the recessed part 26a.

Because the position of the paper width guides 27a, 27b can thus be locked by a simple operation, and the paper width guides 27a, 27b can be unlocked and moved, the paper width guides 27a, 27b can be easily adjusted to the width of the roll paper 100 used.

Furthermore, because the operating part 252 can be easily operated from the recessed part 26a, but cannot be easily moved without a tool or jig that can enter the recessed part 26a, the person using the printer 1 will not accidentally operate the operating part 252 and unlock the sliding members 220 and 230. A configuration that enables easily releasing the lock as needed but prevents the lock from being accidentally released, and is therefore particularly convenient, can thus be achieved.

As shown in FIG. 3, the configuration of printer 1 thus enables easily loading and replacing roll paper 100 by simply opening the roll paper cover 20 and inserting the roll paper 100, and can reliably control the position of the roll paper 100 widthwise. The roll paper 100 can thus be prevented from becoming skewed, and the label paper can be consistently conveyed, printed, and output.

Furthermore, because the sliding members 220 and 230 are locked in position by friction as a result of applying pressure to the wall parts 223, 233 by means of a pressure spring 255 at a position where the wall parts 223, 233 overlap, the sliding members 220 and 230 can be reliably locked with high precision.

For example, while securing and preventing the sliding members 220 and 230 from moving by restricting rotation of the middle gear 240 is also conceivable, backlash corresponding to the play in the meshing gears may occur, and the paper width guides 27a, 27b may move from their positions they held when the middle gear 240 was restricted. Chattering commensurate to the play in the gears may also result.

However, because the sliding members 220 and 230 are locked in the position at which the pressure member 250 is operated so that the two wall parts 223, 233 are pressed together and secured by friction as described above, the paper width guides 27a, 27b can be positioned and locked with high precision in the desired position without being affected by any gear teeth backlash.

Furthermore, because the wall parts 223, 233 of the sliding members 220 and 230 overlap side by side in the discharge direction of the roll paper 100, and top ribs 224, 234 and bottom ribs 225, 235 are rendered on the wall parts 223, 233, strong friction is produced between the sliding members 220 and 230 by the pressure transferred through the pressure member 250, and the paper width guides 27a, 27b can be reliably locked.

Yet further, when the pressure member 250 is turned and the sliding members 220 and 230 locked, the wall parts 223, 233 are locked by the elastic force working between the support part 262 and the engaging part 263 of the flat spring 260. More specifically, when the pressure member 250 rotates, the engaging part 251 works to expand the gap between the engaging part 263 and the wall part 233, and presses the wall parts 233, 223 to the support part 262 side. As a result, the engaging part 251 and wall parts 223, 233 are secured between the support part 262 and the engaging part 263. The sliding members 220 and 230 are therefore positively locked, the paper width guides 27a, 27b can be locked, the pressure applied to the sliding members 220 and 230 can be controlled to a suitable level, and the load on the sliding members 220 and 230 can be controlled within a suitable range.

Furthermore, because the engaging part 251 contacts the wall part 233 through the pressure spring 255, the sudden application of force to the wall parts 233, 223 is buffered by the flexibility of the pressure spring 255. A longer service life can therefore be achieved in the sliding members 220 and 230, the strength required in the sliding members 220 and 230 can be reduced, and size and cost can be reduced.

Furthermore, because the pair of sliding members 220 and 230 slide symmetrically to the center of the exit paper guide 26, the paper width guides 27a, 27b can be secured and released with a simple operation.

Yet further, because the widthwise position of the roll paper 100 is restricted so that the widthwise position of the roll paper 100 is aligned with the center of the transportation path P, the roll paper 100 can be conveyed smoothly. Yet further, because the roll paper guide 62a positions the roll paper 100 to the center of the transportation path P inside the case 10, the roll paper 100 can be conveyed even more smoothly.

A preferred embodiment of the invention is described above, but the invention is not limited to the foregoing embodiment. For example, a configuration in which an exit paper guide 26 is attached to the paper exit 25 disposed to the front of the printer 1, and the paper width guides 27a, 27b are disposed slidably on the inclined surface of this exit paper guide 26, is described in the foregoing embodiment of the invention, but the invention is not so limited, and a configuration in which the paper exit 25 is rendered in the top of the printer 1, and the paper width guides 27a, 27b that guide the roll paper 100 discharged from the paper exit 25 are disposed to the top or the front of the printer 1, is also conceivable.

In addition, a configuration in which the sliding members 220 and 230 that support the paper width guides 27a, 27b are disposed on the back side of the exit paper guide 26 is described by way of example above, but the invention is not so limited. For example, a configuration in which the paper width guides 27a, 27b are supported by sliding members exposed on top of the exit paper guide 26 is also conceivable.

Yet further, a configuration in which the wall part 223 of the sliding member 220 and the wall part 233 of the sliding member 230 disposed vertically on the back side of the exit paper guide 26 are secured by the pressure spring 255 is described in the foregoing embodiment, but the wall parts 223, 233 can be disposed horizontally and locked in position by pressured applied to the wall parts 223, 233 from above or below.

The above embodiment of the invention is described using a roll of label paper as the recording medium by way of example, but the recording medium is not limited to label paper, and other types of cut sheet media and continuous media may be used. The recording medium may also be an optical disc medium such as CD or DVD media.

A printer 1 that discharges ink to record images is used by way of example as the recording device, but the invention can also be applied to other types of printers, including thermal printers that record images on thermal paper using a thermal head, dot impact printers, and dye sublimation printers. The invention can also be used in other types of electronic devices having such a printer as a component part.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

What is claimed is:

1. A recording device that records on a recording medium and discharges the recording medium from a discharge exit in a discharge direction, the device comprising:
    a guide member having a guide surface that supports the recording medium after discharge from the discharge exit;
    a pair of side guide members that restrict a position of the recording medium relative to the guide surface traverse to the discharge direction; and
    a support mechanism that supports the pair of side guide members relative to the guide surface, the support mechanism operable to position the side guide members traverse to the discharge direction and lock the pair of side guide members in a desired position, the support mechanism comprising
    a pair of overlapping sliding members, each sliding member coupled with one of the side guide members and configured to move relative to the guide surface traverse to the discharge direction, and
    a pressure member configurable to
    clamp the sliding members together at a position where the pair of sliding members overlap to lock the side guide members in position, and
    unclamp the sliding members by displacing an operating part of the pressure member.

2. The recording device of claim 1, wherein:
    each of the sliding members comprises a panel part extending traverse to the discharge direction;
    the panel parts overlap side by side; and
    one of the panel parts comprises a protrusion facing the panel part of the other sliding member.

3. The recording device of claim 2, further comprising a spring member coupled with the pressure member to generate pressure pushing the panel parts of the mutually overlapping sliding members in contact with each other to clamp the sliding members together.

4. The recording device of claim 3, wherein:
    the pair of sliding members slide symmetrically relative to a centerline of the guide surface.

5. The recording device of claim 4, wherein:
    the support mechanism further comprises a gear mounted to rotate about an axis traverse to the discharge direction; and
    each of the sliding members comprises gear teeth for engagement with the gear.

6. The recording device of claim 5, wherein:
the guide member comprises a recess; and
the operating part of the pressure member is disposed in the recess when the side guide members are locked in position.

7. The recording device of claim 1, wherein:
the pair of sliding members slide symmetrically relative to a centerline of the guide surface.

8. The recording device of claim 7, wherein:
the support mechanism further comprises a gear mounted to rotate about an axis traverse to the discharge direction; and
each of the sliding members comprises gear teeth for engagement with the gear.

9. The recording device of claim 1, further comprising:
a pair of internal side guide members that restrict a position of the recording medium inside a case of the recording device traverse to the discharge direction,
wherein the internal side guide members and the side guide members both constrain side edges of the recording medium so that the recording medium is centered in a transportation path for the recording medium.

10. The recording device of claim 1, wherein:
the guide member comprises a recess; and
the operating part of the pressure member is disposed in the recess when the side guide members are locked in position.

11. A mechanism for supporting a pair of recording medium side guide members in a recording device that records on a recording medium and discharges the recording medium from a discharge exit in a discharge direction, the support mechanism comprising:
a pair of overlapping sliding members, each sliding member coupled with one of the side guide members and coupled with the recording device to move traverse to the discharge direction; and
a pressure member operable to
clamp the sliding members together at a position where the pair of sliding members overlap to lock the side guide members in position, and
unclamp the sliding members by displacing an operating part of the pressure member,
wherein the support mechanism is operable to position the side guide members traverse to the discharge direction and lock the pair of side guide members in a desired position.

12. The support mechanism of claim 11, wherein:
each of the sliding members comprises a panel part extending traverse to the discharge direction;
the panel parts overlap side by side; and
one of the panel parts comprises a protrusion facing the panel part of the other sliding member.

13. The support mechanism of claim 12, further comprising a spring member coupled with the pressure member to generate pressure pushing the panel parts of the mutually overlapping sliding members in contact with each other to clamp the sliding members together.

14. The support mechanism of claim 13, wherein:
the pair of sliding members slide symmetrically relative to a discharge centerline for the recording medium.

15. The support mechanism of claim 14, further comprising a gear mounted to rotate about an axis traverse to the discharge direction, wherein each of the sliding members comprises gear teeth for engagement with the gear.

16. The support mechanism of claim 15, wherein:
the operating part of the pressure member is disposed in a recess of the printer when the side guide members are locked in position.

17. The support mechanism of claim 11, wherein:
the pair of sliding members slide symmetrically relative to a discharge centerline for the recording medium.

18. The support mechanism of claim 17, further comprising a gear mounted to rotate about an axis traverse to the discharge direction, wherein each of the sliding members comprises gear teeth for engagement with the gear.

19. The support mechanism of claim 11, wherein:
the operating part of the pressure member is disposed in a recess of the printer when the side guide members are locked in position.

* * * * *